United States Patent [19]

Aylor

[11] 4,055,911

[45] Nov. 1, 1977

[54] WORM PACKAGE AND METHOD OF PACKAGING WORMS

[76] Inventor: Elmo E. Aylor, 18650 Willow Lane, Hesperia, Calif. 92345

[21] Appl. No.: 693,498

[22] Filed: June 7, 1976

[51] Int. Cl.² ............................................. A01K 97/04
[52] U.S. Cl. ............................................. 43/55; 119/1
[58] Field of Search .................... 43/55; 119/1, 15; 229/DIG. 2; 47/84

[56] References Cited

U.S. PATENT DOCUMENTS 3,245,172  4/1966  Hawks ..................................... 43/55

FOREIGN PATENT DOCUMENTS 542,423  11/1955  Belgium .......................... 229/DIG. 2

*Primary Examiner* — Hugh R. Chamblee
*Attorney, Agent, or Firm* — Charles F. Schroeder

[57] ABSTRACT

The present invention is related to a method and means for packaging earthworms or other light sensitive worms wherein superimposed layers of water absorbent sheet materials are spaced from each other a worm diameter distance or more apart to provide compartment space for containment of worms and to which worms can crawl to hide and thereby, in effect, package themselves in aligned layered relation. More specifically, the package of the present invention can be a roll or a stack comprising superposed spaced layers of moisture absorbent sheet material with corrugated sheet spacers therebetween such as corrugated cardboard which forms longitudinal channels or compartment spaces into which worms can and desire to crawl thereby to effect a self-packaging in aligned relation each to its own channel. The package can then be inserted in an air admitting container such as a perforated plastic bag for handling and storage.

17 Claims, 8 Drawing Figures

U.S. Patent  Nov. 1, 1977  4,055,911
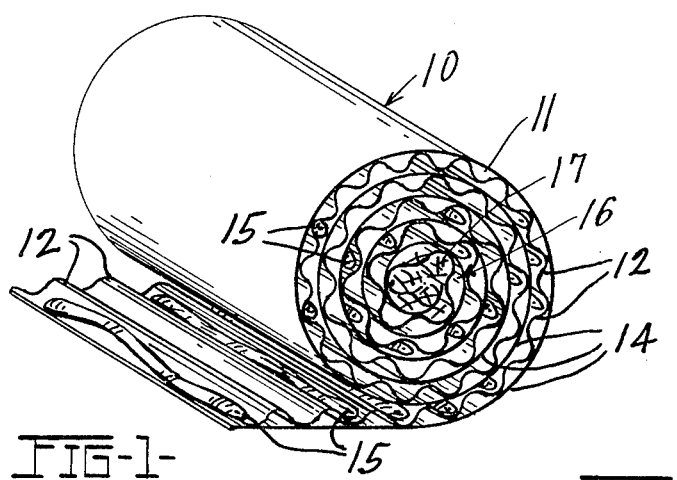
FIG-1-
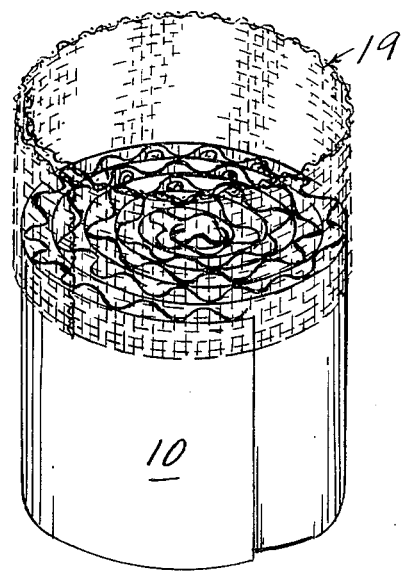
FIG-2-
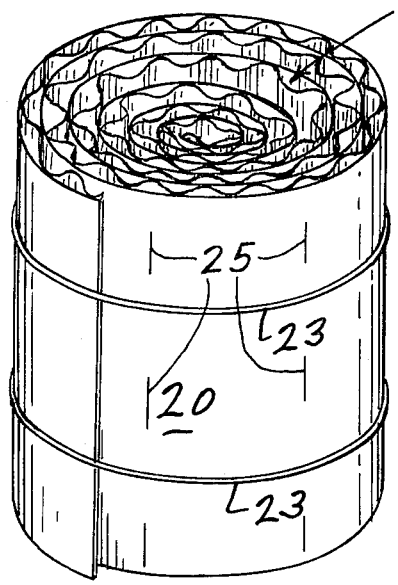
FIG-3-
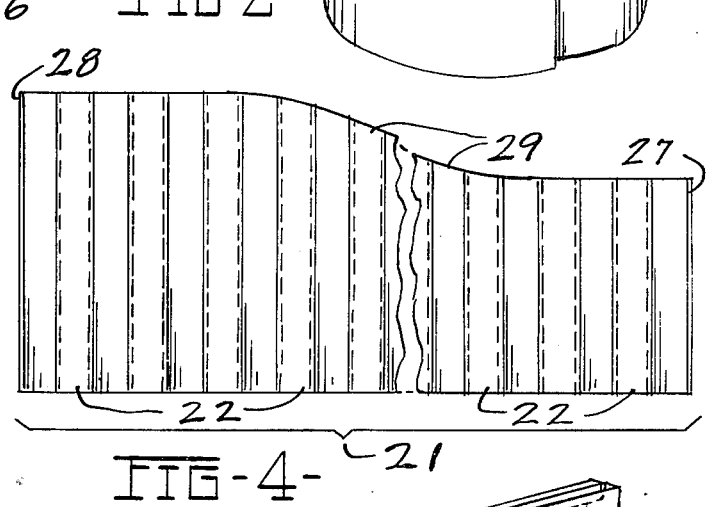
FIG-4-
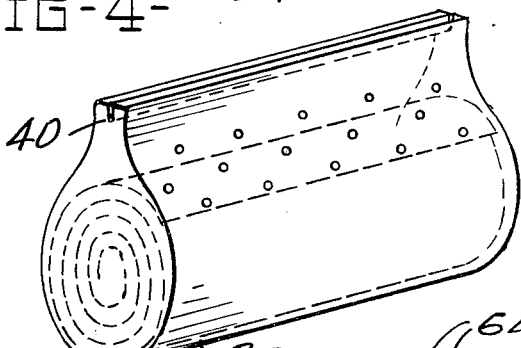
FIG-6-
FIG-5-
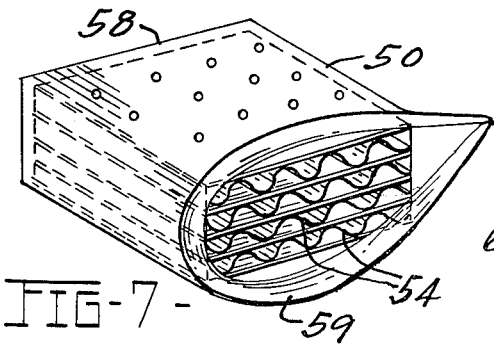
FIG-7-
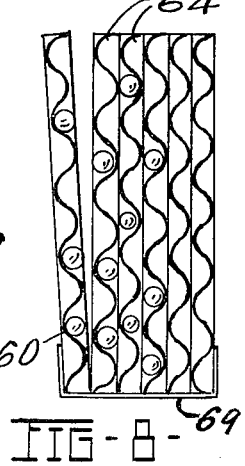
FIG-8-

WORM PACKAGE AND METHOD OF PACKAGING WORMS

It is an object of the present invention to provide a package for containment, shipment and storage of worms which will lend itself to efficient packaging of the worms as well as easy removal of the worms one-by-one as needed by the user such as a fisherman in the field.

It is another object of the present invention to provide a package for packaging of worms which is compartmentalized and constructed so that the worms seek out the compartments and crawl therein to, in a sense, package themselves in aligned layered relation.

It is still another object of the present invention to provide a worm package in which worm food and moisture can be readily incorporated to sustain the life of worms and correspondingly provide longer shelf life for sale and use of worms as needed. In one form of worm package made in accordance with the concepts of the present invention, cardboard sheet material is used of the type having a corrugated cardboard layer glued to a planar flexible paper cardboard sheet rolled into spiral form to provide a cylindrical package. If desired, a cylindrical opening may be provided in the center of the spiral package into which material such as peat moss can be inserted to provide supplementary moisture for sustained comfort and life of the worms. It has been found that worms will eat most cardboard as food when residing in the cardboard compartments of the present invention. The main moisture supply is provided by dipping the rolled package in water and soaking for a period of time. The peat moss or other suitable moisture providing material may then be inserted in the recess as a supplementary source. Thus the package will sustain the life of worms to enable a long storage life.

By spiral winding sheets of corrugated cardboard having a slight slant along one longitudinal edge as disclosed, a recess can be provided at one end of the package into which the worms as a group can be deposited to find their way into their respective compartments and into which peat moss can be stuffed for provision of moisture to each of the longitudinal channels or tubular compartments formed by the corrugations of the package.

The worms are caused to become self-packaged one or more to a compartment by depositing the number to be packaged at the end of a moistened package. Where the package end is not recessed as described above a porous light transmissive sheet, such as a screen is first placed around the package to contain them within the end region over the entrance to the corrugation channels whereupon the worms in seeking darkness will crawl into the longitudinal channels formed by the corrugation between sheet layers for shelter and self-compartmentalization. After the worms have crawled into the longitudinal compartments the screen is removed and the corrugated cardboard package may be inserted in a suitable container such as a hard plastic container having a perforated cover or in a perforated plastic bag.

If such packages are maintained on a shelf for a prolonged period such that they may become too dry, the rolls by themselves or if in a perforated container, can be dipped in water for a short period to provide the moisture necessary to sustain life of the worms. The perforations of the container also allow entry of air which is necessary to sustain the life of the worms. Since the worms like moist cardboard as food, life of the worms can be maintained in the package with air, moisture and a supply of food for a prolonged period.

Features of the invention lie in the case of packaging the worms. According to applicant's invention, the worms themselves in effect crawl into alignment in layers in the novel package construction of the type disclosed.

Another feature of the invention lies in the ease in which worms can be obtained by peeling a portion of the package open such as by unrolling a roll-type package when a worm is desired by the user.

Another and important feature of the present invention lies in the long shelf life and ease of sustaining life of worms without need for additional food and moisture over prolonged periods of storage.

Other objects and features which are belived to be characteristic of my inention are set forth with particularity in the appended claims. My invention, however, both in organization and manner of construction together with further objects and features thereof may be best understood by reference to the following description taken in connection with the accompanying drawings in which:

FIG. 1 illustrates in perspective a partially unrolled worm package made in accordance with the concept of the present invention;

FIG. 2 illustrates the container of FIG. 1 with a light transmissive screen about an end region illustrating an arrangement for stimulating worms to package themselves in the container of the present invention;

FIG. 3 illustrates another package made in accordance with the principles of the present invention shown in its completely rolled form with a recess at one end into which moisture containing material may be inserted;

FIG. 4 illustrates a corrugated cardboard blank shaped such that when rolled it will form a package as shown in FIG. 3;

FIG. 5 is a cross-sectional perspective view of a package like that of FIG. 3 illustrating how recesses for holding moisture containing material can be provided.

FIG. 6 illustrates how the worm package of FIG. 2 may be contained in a perforated plastic envelope for greater ease of handling;

FIG. 7 illustrates another worm package made in accordance with the principles of the present invention wherein compartments are provided in layers which may be peeled off one by one to provide individual worms as desired; and FIG. 8 illustrates still another worm package made in accordance with the principles of this invention wherein compartment layers are provided in a book-like arrangement from which a layer of worms at a time may be torn as needed.

Referring to the drawings in greater detail, the roll package 10 for containment of worms 15 is made of corrugated cardboard material. The corrugated cardboard planar sheet 11 is flexible in character to permit rolling. The corrugted cardboard sheet is glued to one side thereof to provide corrugations 12 which provide the worm compartments and which act as spacers to hold the sheet 11 in spaced relation from itself when rolled in spiral form. When the corrugated cardboard sheet is rolled in this fashion the sheet material in effect becomes a series of layers 14 in overlying relation in which the corrugations act to establish the spacing and provide the plurality of individual longitudinal worm compartments for containment of worms 15.

The roll of corrugated cardboard can be held together by one or more rubber or wire bands, string, or moisture resistant tape. When the user is ready to select a worm for use, the bands are removed to allow the package to become unrolled an amount sufficient to provide the number of worms desired as shown in FIG. 1. FIG. 2 illustrates the manner in which the worms can be packaged in the package 10. The central opening 16 is blanked with peat moss and the roll is then dipped in water to moisten it. A light passing layer of material such as a screen 19 is then placed around an end region of moist package to form a fence for confinement of worms. The worms to be packaged are then deposited in the fenced region and in seeking darkness then crawl into the moist tube-like compartments formed by the corrugations 12. Since the space between the layers is made to be approximately a worm's thickness, the worms upon crawling into the compartments are in a sense cleaned of any extraneous material, such as peat moss into which they might have been contained prior to the packaging. Thus the worms in a sense clean themselves as they package themselves by crawling into the compartments.

It has been found that the worms in a mater of fifteen minutes or less will all crawl into the spaces provided in the container, whereupon the screen 19 can be removed and moist peat moss, or other moist material such as sponge or foam material containing moisture can be placed over the ends of the package. The cardboard in being porous material will absorb the moisture from the peat moss and will effect a cooling of the worms as moisture evaporates from the cardboard such as on hot dry days and thus retain them in moist condition for prolonged periods. If the package should become dry it can be dipped momentarily into a pail of water to reestablish the conditions desired for retaining another period of comfort for the worms.

FIG. 3 shows another package 20 made in accordance with the principles of my invention, like that of FIG. 1 but provided with a recess 26 at one end for loading worms and for holding moisture containing material such as peat moss which will provide the moisture to the worm compartment required for retention of worms in healthy condition. The recess also provides the confined region into which the worms may be deposited for their self-packaging and reduces or does away with the need for a special fence during the worm packaging period.

FIG. 4 illustrates the shape of a blank of corrugated sheet material 21 which can be rolled to form the package 20. The blank of corrugated cardboard sheet material 21 has a narow end 27 and a wider width end 28, the smaller end being formed for the inner portion of the package. The narrow end 27 may be wound about a mandrel of about finger diameter dimension as in the arrangement of FIG. 1 but in the arrangement of FIG. 3 is it preferably wound without a core hole. The spiral rolled blank thus forms a series of layers of longitudinal compartments formed by the corrugations which also act as spacers dimensioned so that the space between layers will permit a worm to crawl therein in sung fit relation. Upon rolling the gradually increasing width blank 21 into the cylindrical package 20, the package acquires a stepped conical recess 26 at one end.

If desired the roll blank can also be slanted along both side edges to provide conical recesses at both ends of the package for retention of moisture material like peat moss.

FIG. 5 illustrates in cross-section such a package 30 of stepped configuration formed by the successive layers, illustrating the narrowest width layer on the interior and with each successive layer to the outer layer being slightly wider.

FIG. 6 illustrates the container installed in a plastic envelope 40 which is perforated to provide air which is necessary to sustain life of the worms. The envelope 40 can, for example, be a zip-lock type commercially available plastic envelope. With a package of proper dimension, upon installation of the container 20 into the envelope 40, moisture containing material such as the peat moss at the ends of the package, can be held in place by the edges of the envelope. FIG. 7 illustrates still another embodiment of my invention wherein the worm compartments are provided by layers 54 of corrugated cardboard sheet material stacked into rectangular configuration and cut to desired length. A closing flap 59 can be provided to cover the worm compartments when not is use. A moist package 50 of this shape can be installed in an air admitting envelope such as perforated envelope 58 with enclosing flaps 59. The worms to be packaged can be deposited over the corrugation channels and allowed to crawl into position. A layer of peat moss may be deposited over the worm channels to provide an environment to sustain life while food for the worms is provided by the cardboard itself.

If desired, additional food can be provided to the constructions of my invention by injecting food into the porous cardboard in liquid form such as peanut oil. Alternately, if desired, a dry type food can be provided, such as granulated sewage sludge distributed over the face of the corrugations within the container. In still another technique, food can be impregnated in the package by dipping it in a liquid food which will penetrate and impregnate the layers of porous material assuring presence of food in all areas of the package for sustenance of life for the worms. Still further food can be injected under corrugations between the corrugated sheet and a planar backing.

The material in the corrugation channel can be of formulation such that it will seep through the moist porous corrugation sheets to provide food for worms on the opposite side over a prolonged period. Slits may also be cut in the corrugations to provide an edge for worms to feed on.

FIG. 8 illustrates another worm package 60 of my invention in which sheets of double faced corrugated cardboard 64 can be arranged in book-like form held together at a hinge 69. When worms are desired for use, a layer or page at a time can be torn away for use. The facing sheets then can be separated from the moist layer to expose the worms as needed.

When the corrugated sheet assembly is generally rectangular as in FIGS. 7 and 8, it can be shaped with a recess or loading cavity such as a "V" shape or dish shape at an edge at which the corrugation channels terminate to permit ready loading of worms for packaging. In both the cylindrical and rectangular packages, the loading cavitiy can be made of volume such that when filled, the number of worms deposited therein are metered to correspond to at least the minimum number to be packaged. That is when the group of worms deposited in the cavity is level with the top edge of the cavity, the number of worms therein will correspond to or be close to the number desied to be packaged. The worms thus loaded, upon exposure to light, will crawl into the corrugation channels of their own volition. The loaded package can be inserted in a transparent carrying bag before the worms crawl into their respective channels, thus minimizing the handling time for packaging since the worms will crawl into place after insertion in the bag or envelope.

The plastic envelope or bag into which the package is inserted can be pinpoint perforated for admission of air in locations such as adjacent the ends of the corrugation channels of the inserted package to promote a cross ventilation of air within the package while stored.

For convenience in removal of worms from the various packages described herein, the backing sheet alone, or the corrugated sheet, or the combination can be provided with slits as slits 25 shown in FIG. 3 or other suitable openings parallel to the corrugations to form tear off sections so that one or more worm strips might be torn from the package with minimum effort. The main body of the package can then be maintained in tact and torn off strips of worms removed and placed in a convenient location such as the user's pocket if desired. A convenient tear off strip might contain three or more worm containing channels.

In view of the foregoing, while the invention has been described in detail with regard to certain embodiments of my invention, it will be understood that my invention is not limited specfically to the particular construction shown and described and accordingly by the appended claims, all adaptions, modifications and arrangements thereof are contemplated which fall within the true spirt and scope of the invention.

I claim:

1. A worm package containing a plurality of worms comprising at least one section of water absorbent sheet material supported in overlying spaced relation over another section of sheet material to form worm compartments between the layers of said sheet material, and
   spacer means disposed between said layers of sheet material dimensioned to provide a space between said layers to permit a worm to crawl therebetween for snug-fit residence therebetween, said package having an entrance opening to said space for entry of worms therein.

2. A package for containment of worms as defined in claim 1 wherein the spacer means is formed of a corrugated water absorbent member between said layers of sheet material.

3. A worm package as set out in claim 1 wherein the package is formed of corrugated cardboard having a face layer of cardboard sheet material.

4. A worm package as set out in claim 3 wherein corrugated cardboard sheet material is rolled in spiral relation on itself to form a cylindrical package.

5. A worm package as set out in claim 4 wherein the corrugation in the layers are oriented in a direction parallel to the axis of rotation of the package.

6. A worm package as set out in claim 4 wherein the roll is formed of a blank narrower in width on the inside end of the package than the end forming the outer layer of the package thereby forming a recess at least at one end of the package for retention of moisture containing material in the package.

7. A package as set out in chain 1 wherein the layers of the container are formed of a porous material impregnated with material which is food for the worms.

8. A worm package containing a plurality of worms comprising a corrugated cardboard layer comprising a planar facing sheet and a corrugated sheet of water absorbent material combined therewith said layer being wound into a multilayer cylindrical package with the corrugations forming worm size channels between layers of the planar sheet with the one end of each of the channels being exposed at an entrance region of the package for entry of the worms therein and a removable retaining band for holding the package in its wound condition until worms are to be removed therefrom.

9. A worm package comprising a corrugated sheet of water absorbent material and a flexible sheet covering one face of said corrugated sheet, the corrugations of said corrugated sheet each being of size to form a channel under said cover sheet to accommodate a worm in snug relation therein said package containing a plurality of worms each aligned in the space of one of said corrugations to form a packaged layer of worms.

10. A package as set out in claim 9 wherein both the flexible sheet and the corrugated sheet are provided with tear means parallel to the corrugation, spaced apart a distance of at least one corrugation to form tear away worm strips for convenience of removal of the worms as needed.

11. A package containing a plurality of worms comprising a plurality of moisture absorbent corrugated sheets assembled in overlying stacked relation;
    a plurality of planar sheets each disposed between a pair of layers of said corrugated sheet material forming worm channels therewith,
    said package having a worm loading recess at an edge to which said worm channels extend.

12. A worm package as set out in claim 11 in which the worm loading recess corresponds in volume generally to the volume of the number of worms to be packaged.

13. A method of packaging worms in aligned relation comprising moistening a water absorbent package having a worm loading recess providing entrance openings to a series of generally parallel longitudinal worm chambers, depositing a plurality of worms in the worm loading recess, exposing the worms to light to which they seek to avoid, allowing time for the worms exposed to such light to crawl into the worm chambers opened to the recess region and then placing porous moisture containing material over the entrance openings to the worm chambers for supplementary supply of moisture to the worms contained therein.

14. A package comprising a corrugated sheet of water absorbent material, a flexible sheet covering one face of said corrugated sheet, the corrugations being of size to form a channel under said cover sheet to accommodate a worm in snug relation, and a plurality of worms each aligned in one of said corrugations to form a packaged layer of worms,
    said flexible sheet being provided with tear means parallel to the corrugations spaced apart a distance of at least one corrugation to form tear away worm strips for convenience of removal of the worms as needed.

15. A package comprising a corrugated sheet of water absorbent material, a flexible sheet covering one face of said corrugated sheet, the corrugations being of size to form a channel under said cover sheet to accommodate a worn in snug relation, and a plurality of worms each aligned in one of said corrugations to form a packaged layer of worms,
    said corrugations sheet being provided with tear means parallel to the corrugations, spaced apart a distance of at least one corrugation to form tear away worm strips for convenience of removal of the worms as needed.

16. A worm package containing a plurality of worms in a plurality of overlying layers each said layer of the package comprising at least one layer of sheet material supported in spaced relation over another layer of sheet material to form compartments between layers of said sheet material, and spacer means disposed between said layers of sheet material dimensioned to provide a space between said layers to permit a worm to crawl therebetween, said package having an entrance opening to said space for entry of worms therein.

17. A method of packaging worms in aligned relation comprising moistening a water absorbent package having a worm loading recess providing entrance openings to a series of generally parallel longitudinal worm chambers, depositing a plurality of worms in the worm loading recess, exposing the worms to light to which they seek to avoid, allowing time for the worms exposed to such light to crawl into the worm chambers opened to the recess region.

* * * * *